(12) United States Patent
Ito

(10) Patent No.: US 8,539,356 B2
(45) Date of Patent: Sep. 17, 2013

(54) IMAGE FORMING APPARATUS, AUTHORITY MANAGEMENT METHOD OF IMAGE FORMING APPARATUS, AND AUTHORITY MANAGEMENT SYSTEM OF IMAGE FORMING APPARATUS

(75) Inventor: Maiko Ito, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/041,709

(22) Filed: Mar. 7, 2011

(65) Prior Publication Data
US 2011/0219326 A1 Sep. 8, 2011

Related U.S. Application Data

(60) Provisional application No. 61/311,571, filed on Mar. 8, 2010.

(51) Int. Cl.
*G06F 3/00* (2006.01)
*G06F 7/04* (2006.01)

(52) U.S. Cl.
USPC ............... 715/741; 715/743; 715/771; 726/2; 726/4; 726/26; 726/27

(58) Field of Classification Search
USPC .................. 715/741, 743, 771; 726/2, 4, 26, 726/27
See application file for complete search history.

(56) References Cited

U.S. PATENT DOCUMENTS

| | | | |
|---|---|---|---|
| 7,225,190 B2 * | 5/2007 | Iwamura et al. ................. 1/1 |
| 2005/0172151 A1 | 8/2005 | Kodimer et al. |
| 2006/0026434 A1 * | 2/2006 | Yoshida et al. ............... 713/182 |
| 2006/0190693 A1 * | 8/2006 | Asano et al. ................... 711/163 |
| 2008/0086612 A1 * | 4/2008 | Murayama et al. ........... 711/163 |
| 2008/0104044 A1 * | 5/2008 | Kardamilas et al. .............. 707/4 |
| 2008/0270408 A1 | 10/2008 | Ratnala |
| 2009/0024931 A1 * | 1/2009 | Bae ............................... 715/748 |

(Continued)

FOREIGN PATENT DOCUMENTS

JP 2009070168 4/2009

*Primary Examiner* — Tadeese Hailu
(74) *Attorney, Agent, or Firm* — Turocy & Watson, LLP

(57) ABSTRACT

There is provided an image forming apparatus which can simply create a role that is an assembly of the authorities for using each function of the image forming apparatus.

The image forming apparatus includes an operation input unit receiving an input of operation performed by a user; a selection information obtaining unit obtaining role selection information indicating a role selected by the input of the operation performed in the operation input unit from at least one role out of roles having at least one authority per role and registered in advance; an authority information obtaining unit obtaining information indicating the authority of the selected role; a display control unit displaying a role creation screen in which the authority that can be provided to the role to be newly created can be selected and displaying a state where the authority of the selected role is selected as an authority to be provided to the role to be created in the role creation screen based on the information indicating the authority obtained by the authority information obtaining unit; a selected authority information obtaining unit obtaining the information indicating the authority that is selected when an input for completing selection of authority is performed, in the case the input for completing the selection of authority is performed in the role creation screen by the operation input unit; and a storage control unit storing the authority obtained by the selected authority information obtaining unit in a storage area in association with the information indicating the created role.

17 Claims, 10 Drawing Sheets

(56) References Cited

U.S. PATENT DOCUMENTS

| | | |
|---|---|---|
| 2009/0077659 A1 | 3/2009 | Segawa |
| 2009/0112791 A1* | 4/2009 | Nakagoshi .................. 707/1 |
| 2010/0235888 A1* | 9/2010 | Miyamoto .................. 726/4 |
| 2011/0099345 A1* | 4/2011 | Mitsui .................. 711/162 |
| 2011/0126270 A1* | 5/2011 | Sato et al. .................. 726/4 |
| 2011/0218892 A1* | 9/2011 | Jeong et al. .................. 705/30 |

* cited by examiner

FIG.2

| Authority \ Role | Admin | Guest | Print | Print Operator | Copy |
|---|---|---|---|---|---|
| Copy Function | ✓ | ✓ | | | ✓ |
| Print Function | ✓ | | ✓ | | |
| Print Job | ✓ | ✓ | ✓ | | |
| Print Management | ✓ | | ✓ | ✓ | |
| Scan Function | ✓ | | | | |
| Fax Function | ✓ | | | | |
| Color | ✓ | | | | |
| Local File Share | ✓ | | | | |
| Store to Local Strage | ✓ | | | | |
| Store to USB Device | ✓ | | | | |

Create New Role

[Save] [Cancel]

42 → Role Name [Print Copy]

44 { 45 → Base Role 1 [Print ▾]
46 → Base Role 2 [ ▾]

48
- ☐ Copy Function
- ☑ Print Function
  - ☑ Print Job
  - ☑ Print Management
- ☐ Scan Function
- ☐ Fax Function
- ☐ Color
- ☐ Local File Share
  - ☐ Store to Local Strage
  - ☐ Store to Local USB
- ☐ Remote
  - ☐ Send Email
  - ☐ Send To Remote Server

IMAGE FORMING APPARATUS, AUTHORITY MANAGEMENT METHOD OF IMAGE FORMING APPARATUS, AND AUTHORITY MANAGEMENT SYSTEM OF IMAGE FORMING APPARATUS

CROSS-REFERENCE TO RELATED APPLICATIONS

This application is based upon and claims the benefit of priority from U.S. provisional application 61/311,571, filed on Mar. 8, 2010; the entire contents of which are incorporated herein by reference.

FIELD

The embodiment disclosed in the present specification relates to setting authorities in an image forming apparatus.

BACKGROUND

Conventionally, when an image forming apparatus such as an MFP (Multi Function Peripheral) is used, an authorization is performed to provide the authority to a user so that the user can use permitted functions. Specifically, for example, when a copy function, a print function, and a scan function are permitted, authorities permitting the use of these functions are provided.

Also, since the MFP has a large number of functions, a role constituted by a combination of various authorities is created, and the role which fits the authority for which permission is desired is assigned to the user.

However, it is necessary that the role is created by selecting the authority of each function one by one. Particularly, since the image forming apparatus such as the MFP has many functions, the creation of the role is cumbersome.

DESCRIPTION OF THE DRAWINGS

FIG. 2 is an example of a role table stored in a role storage area.
FIG. 4 is an example of a role creation screen.

DETAILED DESCRIPTION

According to the embodiment, the image forming apparatus includes an operation input unit, a selection information obtaining unit, an authority information obtaining unit, a display control unit, a selected authority information obtaining unit, and a storage control unit.

The operation input unit receives the input of an operation performed by a user. The selection information obtaining unit obtains role selection information indicating the role which is selected through the operation performed by the operation input unit from at least one role out of roles having at least one authority per role and registered in advance. The authority information obtaining unit obtains the information indicating the authority of the selected role. The display control unit displays the role creation screen in which the authority that can be provided to the role to be newly created can be selected. Also, in the role creation screen, the display control unit displays a state where the authority of the selected role is selected as an authority to be provided to the role to be created, based on the information indicating the authority obtained by the authority information obtaining unit. In the case an input for completing the selection of authority is performed in the role creation screen by the operation input unit, the selected authority information obtaining unit obtains the information indicating the authority that is selected when the input for completing selection of authority is performed. The storage control unit stores the authority obtained by the selected authority information obtaining unit in a storage area, in association with the information indicating the role to be created. Hereinafter, the embodiment will be described with reference to drawings.

First Embodiment

Figure 1:
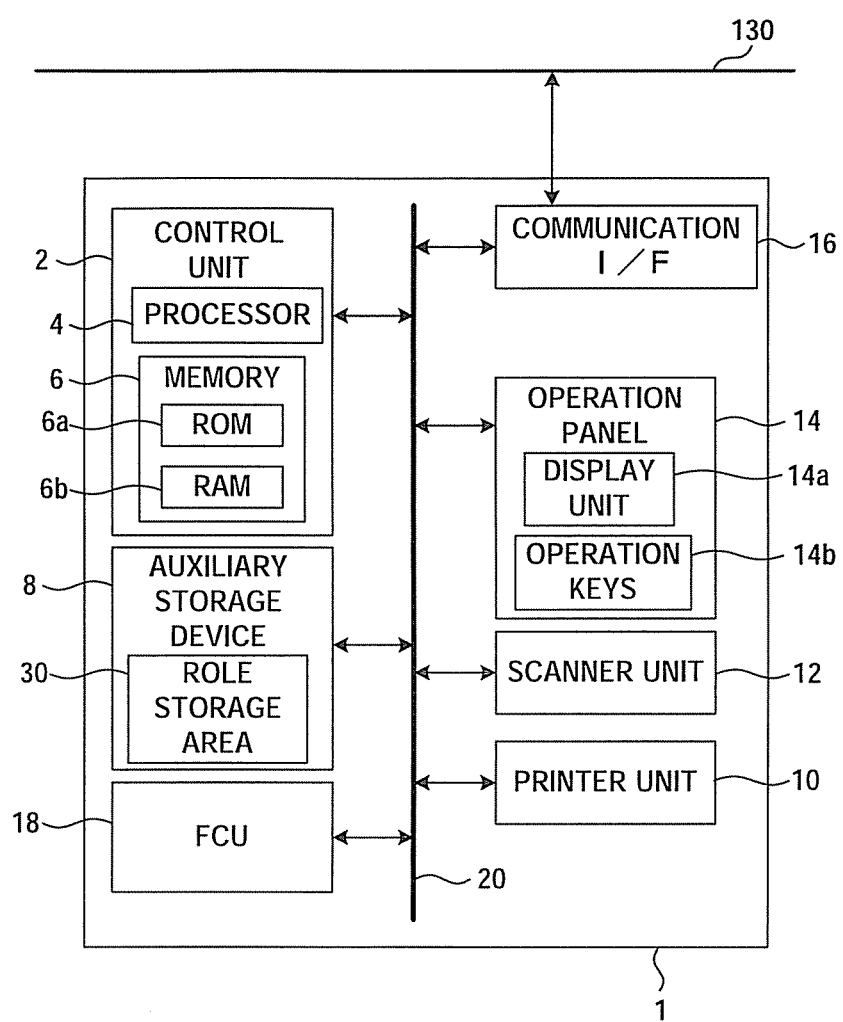
FIG. 1 is a block diagram describing the configuration of an image forming apparatus.

FIG. 1 is a block diagram describing the configuration of an image forming apparatus 1 of the embodiment.

The image forming apparatus 1 includes a control unit 2, an auxiliary storage device 8, a printer unit 10, a scanner unit 12, an operation panel 14, a communication interface (communication I/F) 16, and a facsimile control unit (FCU) 18. Each component of the image forming apparatus 1 is connected through a bus 20.

The control unit 2 functions according to a processor 4, a memory 6, and an operating system (OS).

The processor 4 is a CPU (Central Processing Unit) or a MPU (Micro Processing Unit).

The memory 6 is a semiconductor memory for example. The memory 6 includes a ROM (Read Only memory) 6a storing a control program of the processor 4 and a RAM (Random Access Memory) 6b temporarily providing an operation area to the processor 4.

Based on the control program or the like stored in the ROM 6a or the auxiliary storage device 8, the control unit 2 controls the printer unit 10, the scanner unit 12, the operation panel 14, the communication I/F 16, and the FCU 18, for example. The control unit 2 may further include various image processing functions. Further, the control unit 2 may include an ASIC (Application Specific Integrated Circuit) realizing a part or all of the functions included in the image forming apparatus 1.

The auxiliary storage device 8 stores an application program and the OS. The application program includes programs performing functions of the image forming apparatus 1 such as a copy function, a print function, a scan function, a fax function, and a network file function. The application program further includes an application (Web browser) for a Web client and other application programs.

The auxiliary storage device 8 stores image data generated by reading an original document with the scanner unit 12 and data obtained from an external device connected to the communication I/F 16 through a network 130 or the like. The auxiliary storage device 8 temporarily stores a print job transmitted from an external client terminal connected through the network 130 until the print job is performed.

The auxiliary storage device 8 of the embodiment includes a role storage area 30. In the role storage area 30, each role is stored in association with the authority included in the role.

Herein, the "role" in the embodiment is an assembly of authorities for using various functions of the image forming apparatus 1. The role is managed by a role table 32 in which the role is associated with the authority. FIG. 2 is an example of the role table 32 stored in a role storage area 30.

In the role table 32 shown in FIG. 2, as the role, Admin, Guest, Print, Print Operator, and Copy are shown as examples. In a case of the role of Admin, the authority is provided for all functions, so if the role is Admin, all functions can be used. In a case of Guest, it is shown that the authority is provided for Copy and Print Job, and in a case of Print, it is shown that the authority is provided for Print Function, Print Job, and Print Management. In a case of Print Operator, it is shown that the authority is provided for Print Management, and in a case of Copy, it is shown that the authority is provided for Copy Function.

As the auxiliary storage device 8, for example, a magnetic storage device such as a hard disk drive, an optical storage device, a semiconductor storage device (flash memory for example) or an arbitrary combination of these storage devices can be used. The auxiliary storage device 8 appropriately saves a software update, a protected electronic document, text data, account information, and policy information, for example.

The printer unit 10 forms the image corresponding to the image data of the original document read by the scanner unit 12 and the image corresponding to the data transmitted from the client terminal such as an external computer through the network 130 on a sheet.

The scanner unit 12 includes a built-in scanning and reading unit reading the original document as an image, an original document loading table, and an automatic original document carrying device carrying the original document to the reading position. The scanning and reading unit of the scanner unit 12 reads the original document set in the original document loading table or in the automatic original document carrying device.

The operation panel 14 includes a touch panel type of display unit 14a and various operation keys 14b. For example, the display unit 14a displays items of instruction regarding printing conditions such as the paper size, the number of copies, the printing density setting, or finishing (stapling or folding). The operation keys 14b include, for example, a numeric keypad, a reset key, a stop key, and a start key. A user can provide the instructions regarding various processes and the items displayed on the display unit 14a by inputting the instructions from the display unit 14a or the operation keys 14b. Also, the operation panel 14 of the embodiment displays the role creation panel in which the role is created.

The communication I/F 16 is an interface connecting the image forming apparatus 1 to the network 130. For example, the communication I/F 16 is connected to an external device through the network 130 by appropriate wireless communication based on Bluetooth (registered trademark), infrared connection, and IEEE 802.15, IEEE 802.11, IEEE 802.3, and IEEE 1284 referred to as optical connection or by wire communication. The communication I/F 16 includes a buffer, and temporarily holds a part or all of the data received through the network 130 in the buffer.

Through the communication I/F 16, the control unit 2 communicates with an external device, for example, a client terminal connected through the network 130.

A facsimile control unit (FCU) 20 controls the transmission and the reception of the facsimile in the image forming apparatus 1.

Figure 3:
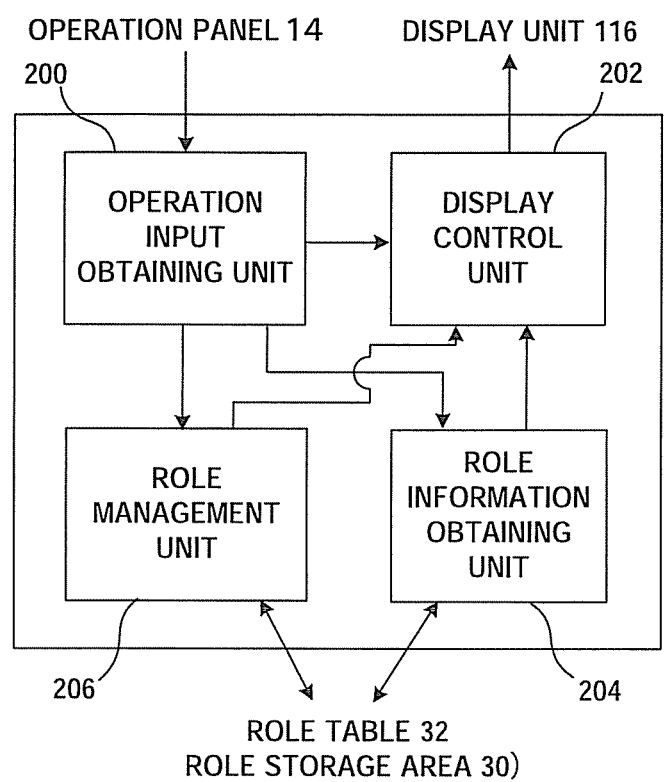
FIG. 3 is a functional block diagram showing the function of an image forming apparatus.

Next, the setting of the role performed by the image forming apparatus 1 will be described. FIG. 3 is a functional block diagram showing the function of the image forming apparatus 1.

The image forming apparatus 1 includes an operation input obtaining unit 200 as the selection information obtaining unit and the selected authority information obtaining unit, a display control unit 202, a role information obtaining unit 204 as the authority information obtaining unit, and a role management unit 206.

The operation input obtaining unit 200 obtains the input of an operation performed by the user from the operation panel 14. In the embodiment, regarding the creation of the new role, the operation input obtaining unit 200 obtains the input of various operations and the information generated by the input of the operation.

The display control unit 202 displays the role creation screen in which the role is created, on the display unit 14a.

When the role is newly created in the role creation screen, the role information obtaining unit 204 obtains the information regarding the role that is already registered from the role table 32 of the role storage area 30.

As a storage control unit, the role management unit 206 saves the created new role in the role storage area 30 when the input for creating the role is performed by the user in the role creation screen and the role is created. Specifically, as shown in the role table 32 in FIG. 2, the role is an assembly of authorities. Accordingly, the role management unit 206 registers the information (for example, the name) indicating the newly created role in the role table 32 of the role storage area 30 in association with the authority associated with the newly created role.

Figure 5:
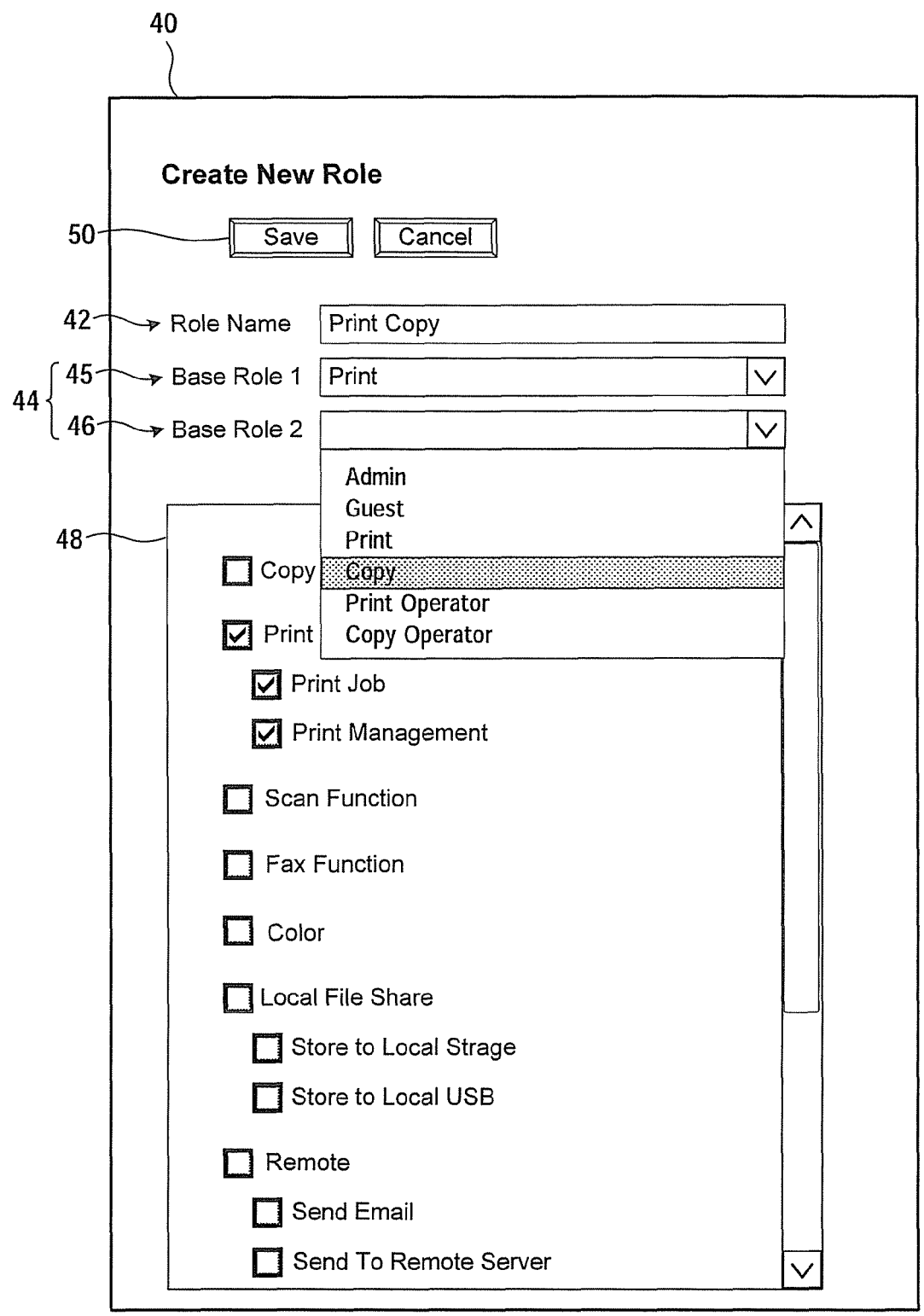
FIG. 5 is an example of a role creation screen.

Herein, the role creation performed in the role creation screen displayed according to the function of the image forming apparatus 1 of the above embodiment will be described. FIGS. 4 and 5 are role creation screens. When the user operates the operation panel 14 to input operations for displaying the role creation screen, a role creation screen 40 is displayed on the display unit 14a by the display control unit 202. In the description below, as the new role, a case of creating the role which is a combination of the Print role and the Copy role will be described as an example.

The role creation screen 40 includes a Role Name input column 42, a first and a second Base Role selection column 45 and 46 as Base Role selection columns 44, and an authority display column 48, and a save button 50, for example.

The name of the role to be newly created is input in the Role Name input column 42. In FIG. 4, a state where the name of the role referred to as Print Copy is input is shown.

The Base Role selection column 44 is a column for selecting a base role which is the base of the new role among the roles that are already registered in the role table 32 when creating the new role. For example, when the user opens the pull down menu of the Base Role selection column 44 and selects any role among the displayed roles, the operation input obtaining unit 200 obtains the information (role selection information) indicating the selected role. Subsequently, based on the information obtained by the operation input obtaining unit 200, the role information obtaining unit 204 obtains the information indicating the authority associated with the selected role from the role table 32.

Thereafter, in the authority display column 48, the display control unit 202 displays a state where the checkbox of the authority associated with the selected base role obtained by the role information obtaining unit 204 is checked. In FIG. 4, a state where the Print role is selected among the existing roles in the first Base role selection column 45 is shown. In the authority display column 48, the checkboxes of the Print Function, the Print Job, and the Print Management which are authorities corresponding to the Print role are checked. In this manner, by enabling the existing role to be the base when the new role is created, it is not necessary to perform the operation (the operation of making a state where the checkboxes are checked in FIG. 4) of selecting the authorities to be provided to the role to be newly created one by one from among a large number of authorities.

Moreover, in FIG. 5, the pull down menu of the second Base Role selection column 46 is opened by the operation of the user, and the Copy role is selected. When the Copy role is selected, the role information obtaining unit 204 obtains the information indicating the authority corresponding to the Copy role from the role table 32 in a similar manner. Thereafter, based on the information obtained by the display control unit 202, the checkboxes of the corresponding authorities in the authority display column 48 are checked. As shown in FIG. 2, the Copy role is in association with the authority of the Copy Function; therefore, when the Copy role is selected, the checkbox of the Copy Function of the authority display column 48 is checked and displayed.

In the authority display column 48, in addition to the selection of the base role, the user can further select an authority separately and give the authority to the new role. It is also possible for the user to remove the selection of the authority separately to reduce the authorities. For example, in addition to the selection of the Print and the Copy as the base role, it is possible to provide the authority of the Fax Function to the Print Copy role by checking the checkbox of the Fax Function. It is also possible to remove the authority of the Print Management from the authorities of the Print Copy role by unchecking the checkbox of the Print Management. The selection and the removing of the separate authority may be performed before or after the selection of the base role.

In the manner described so far, when the selection of the authority provided to the Print Copy to be created is completed, the user presses the save button 50, and as a result, the operation input obtaining unit 200 as the selected authority information obtaining unit obtains the information indicating the selected authority and the name Print Copy that is the information indicating the role to be created. Subsequently, the role management unit 206 associates the obtained authority with the information indicating the role to be created and stores them in the role table 32. In this manner, the role creation is completed.

In this way, according to the embodiment, it is possible to simply create the new role referred to as the Print Copy role that is the combination of the Print role and the Copy role. Also, by separately selecting an authority or removing the selection in the state where the authority is selected due to the selection of the base role, it is possible to freely set the authorities of the role to be newly created.

A role created by the above process or a role registered in advance can be assigned to the user or departments singly or as a combination of a plurality of roles.

Figure 6:
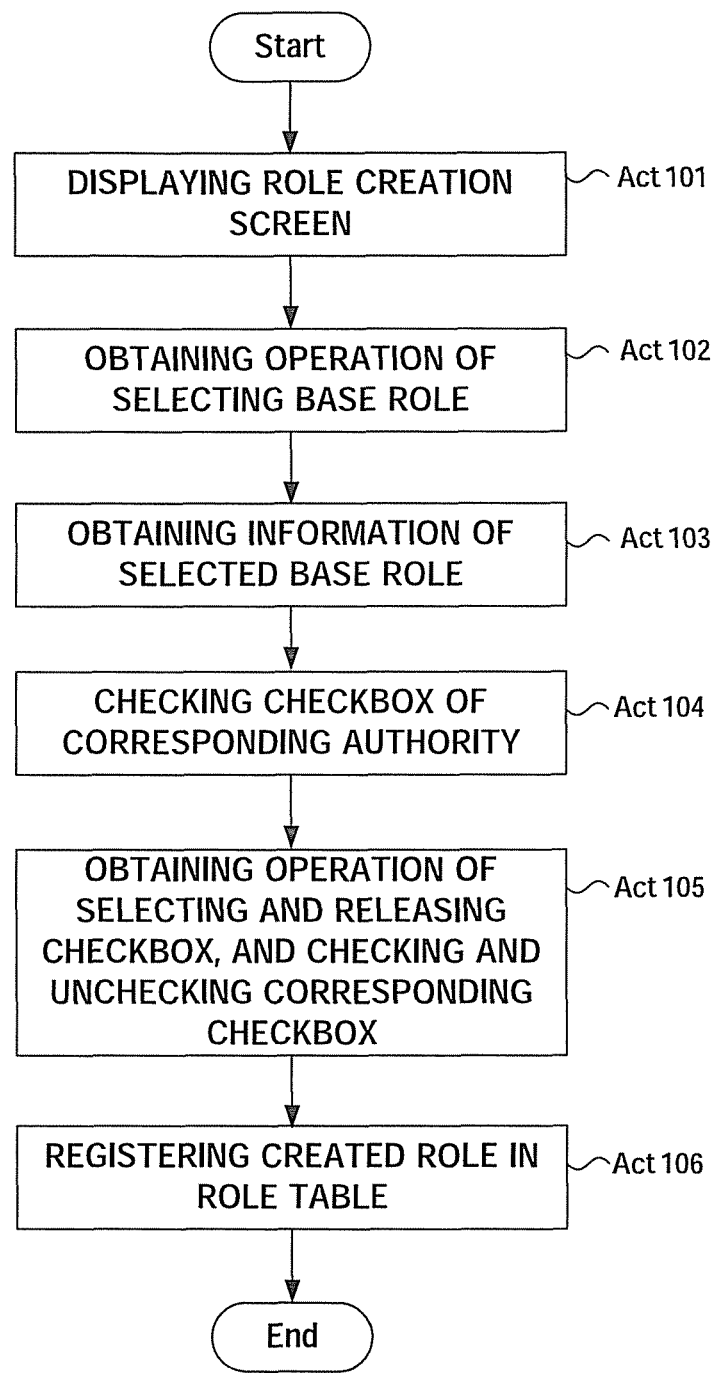
FIG. 6 is a flowchart showing the flow of role creation.

Next, the flow of the role creation of the image forming apparatus 1 will be described. FIG. 6 is a flowchart showing the flow of the role creation.

First, when the user operates the operation panel 14 to provide an instruction for displaying the role creation screen 40, the operation input obtaining unit 200 obtains the input of the operation, and the display control unit 202 displays the role creation screen 40 on the display unit 14a (Act 101).

Next, when the user selects the base role in the Base Role selection column 44 in the role creation screen 40 displayed on the display unit 14a, the operation input obtaining unit 200 obtains the input of the operation of the selection (Act 102).

Thereafter, the role information obtaining unit 204 obtains the information of the selected role from the role table 32 stored in the role storage area 30 (Act 103). Specifically, when the base role is selected, the role information obtaining unit 204 obtains the information indicating the authority associated with the selected role, from the role table 32 stored in the role storage area 30.

Subsequently, based on the information obtained by the role information obtaining unit 204, the display control unit 202 displays a state where the checkbox of the authority associated with the selected role is checked in the authority display column 48 (Act 104).

When the user selects a plurality of the base roles, the process from the Act 102 to Act 104 is repeated.

After that, in addition to the authority selected by the selection of the base role, when the user performs the operation of separately selecting another authority, or the operation of separately removing the authority selected by the selection of the base role, the operation input obtaining unit 200 obtains the input of the operation. Subsequently, based on the obtained input of the operation, the display control unit 202 checks or unchecks the checkbox of the corresponding authority in the authority display column 48 to select the corresponding authority or to remove the selection of the selected authority (Act 105).

Thereafter, when the user presses the save button 50 of the role creation screen 40 after the setting of the authority of the new role is completed, the operation input obtaining unit 200 obtains the name of the role to be created and the information indicating the authority selected in the role creation screen 40 which are input at any timing from Act 101 to Act 105, and the role management unit 206 associates the name with the information and registers them in the role table 32 (Act 106).

The above is the flow of newly creating the role in the image forming apparatus 1 of the embodiment. The selection of the base role and the corresponding authority performed from Act 102 to Act 104, and the separate selection or removing of the authority performed by the user in Act 105 are not limited to this order. The base role may be selected after the user selects the desired authority first.

According to the image forming apparatus 1 of the embodiment described so far, by selecting the role registered in advance as the base role, it is possible to simply set the authority to be provided to the role to be newly created.

Furthermore, since it is possible that the authority can be further selected separately or the selection of the authority provided to the selected base role can be removed in the state where the corresponding authority is selected by the selection of the base role, it is possible to easily create the role having the desired authorities by freely setting the authorities of the role to be newly created.

When there is a role that has the same name and the authority as the role registered already in the role creation screen 40, guidance regarding this fact may be displayed. For example, when the same name as the role that is already registered in the role table 32 is input in the Role Name input column 42, the Base Role selection column 44 may display the role or a dialogue providing notification of that fact. Also, when the user presses the save button 50 and the authority of the new role to be created is the same as the role registered already, guidance regarding this fact may be displayed. For example, when the authority of the role to be newly created is the same as the role with the name Print, guidance such as, "The role having the same authority exists. Is the role to be newly created?" may be displayed. In addition, the determination regarding whether there is a role having the same name and authority may be performed by the role information obtaining unit 204 or by a dedicated determination unit.

In the embodiment, the role creation is described in a manner in which the role creation screen 40 is displayed on the display unit 14a of the image forming apparatus 1, and the role is created by operating the display panel 14; however, the role creation is not limited thereto. For example, using the browser function of the external device such as the client terminal communicably connected to the image forming apparatus 1 through the network 130, the same role creation screen may be displayed on the client terminal. By selecting the base role in the role creation screen displayed on the client terminal, it is possible to create the new role. When the new role is created in the client terminal, information such as the name of the role indicating the new role and information in association with the selected authority may be output to the image forming apparatus 1 from the client terminal, and the image forming apparatus 1 may register the information in the role table 32.

Needless to say, the new role created according to the embodiment can be used as the base role the next time a role is created by the method described in the embodiment.

In the embodiment, the description in which two selection columns are displayed as the Base Role selection column 44 is made. However, the embodiment is not limited thereto, and only one or three or more selection columns may be provided. Also, when the Base Role is selected in a single selection column, the selection column may be added and displayed.

Further, in the embodiment, description is made in which, when the base role is selected in the Base Role selection column 44 of the role creation screen 40, the role information obtaining unit 204 obtains the information of the selected role from the role table 32. However, the embodiment is not limited thereto, and the role information obtaining unit 204 may obtain all of the information of the role registered in the role table 32 when the role creation screen 40 is displayed. Also, when the base role is selected, the display control unit 202 can acquire the information of the role selected from the information of the role that is already obtained and can display the information.

Second Embodiment

Next, the second embodiment will be described. In the embodiment, when the newly created role is saved in the role creation screen 40, a confirmation screen 70 as shown in FIG. 7 is displayed for confirming the authority to be provided according to the created role.

Figure 7:
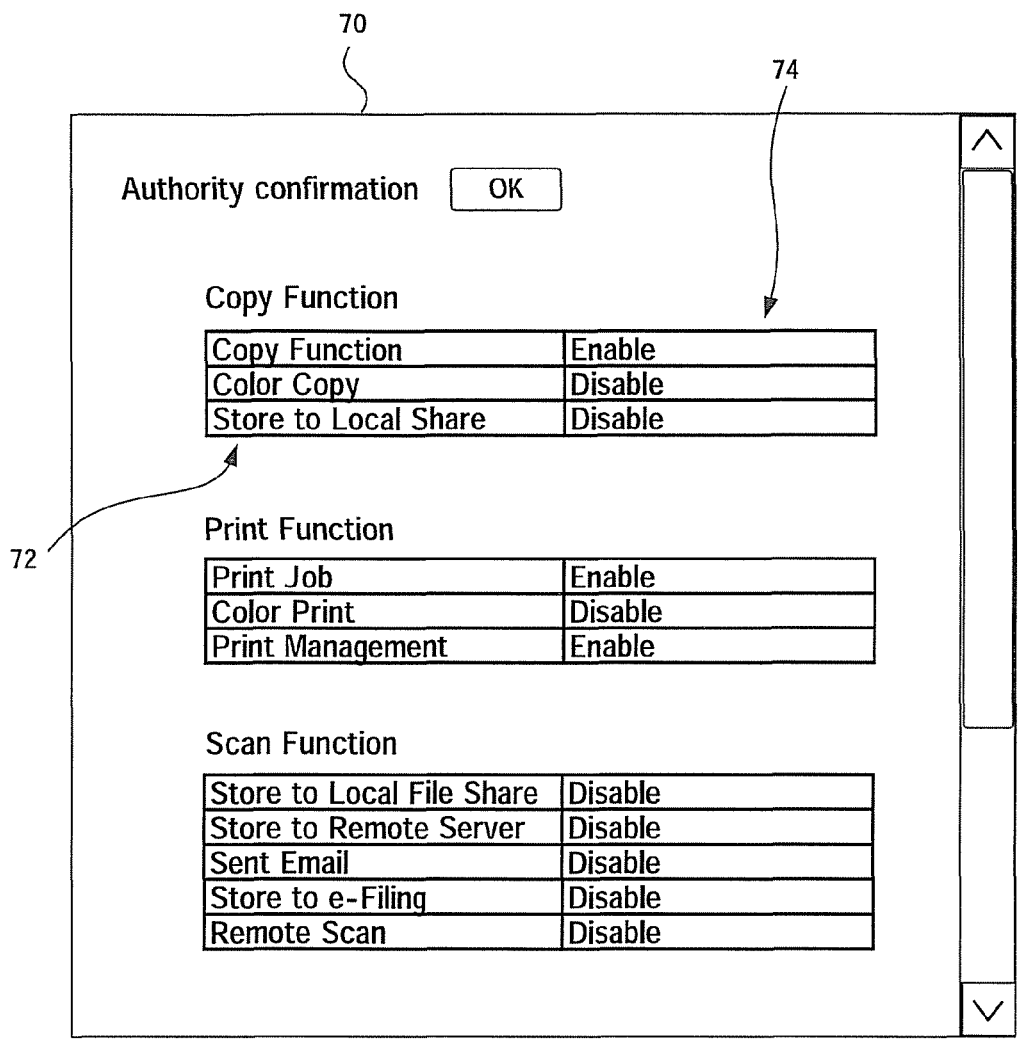
FIG. 7 is an example of a confirmation screen displayed by an image forming apparatus.

FIG. 7 is an example of the confirmation screen displayed by the image forming apparatus of the embodiment. In the confirmation screen 70, for example, for each function such as the copy function and the print function, the authority (displayed in an authority display column 72 in FIG. 7) relating to the function and the existence (displayed in an authority existence display column 74 in FIG. 7) of the authority are displayed. By the confirmation screen 70, it is possible to confirm at a glance that which authority is provided or not provided to the role to be newly created.

Among the authorities, some authorities are not provided when only a single authority is selected. For example, the authority referred to as the Color Copy is provided when both the authority of Copy Function and the authority of Color are provided. In this way, when there is an authority (composite authority) which is provided by the selection of a plurality of authorities, in some cases it cannot be directly known whether the authority will be provided by the checking or unchecking of the checkboxes of the role creation screen 40. Accordingly, displaying the confirmation screen 70 makes it possible to clearly grasp the existence of the authority.

Hereinafter, the displaying of the confirmation screen 70 will be described; here, the same configuration as the first embodiment is denoted by the same symbols, and the description thereof is not repeated.

Figure 8:
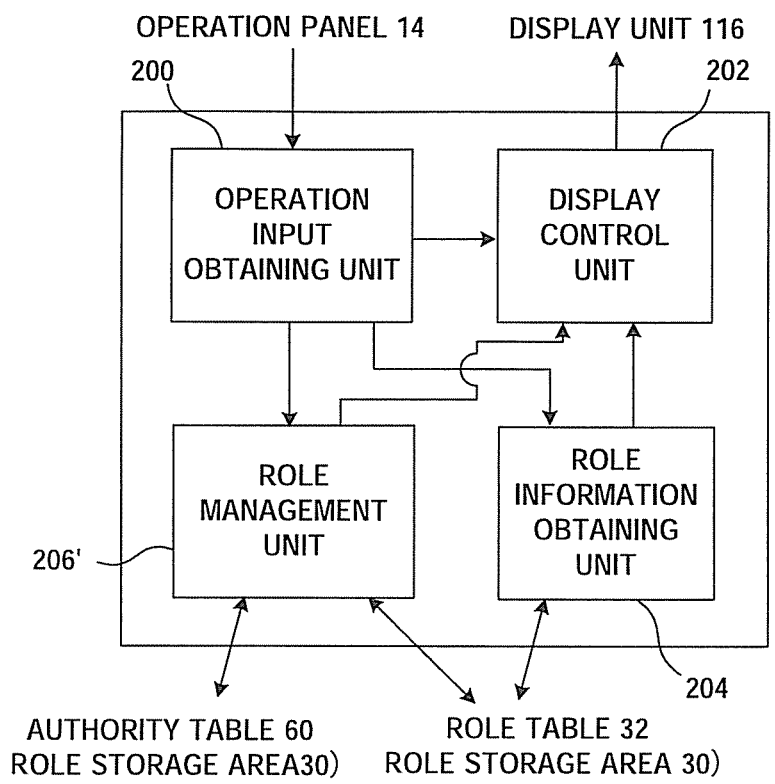
FIG. 8 is a functional block diagram showing a function of an image forming apparatus.

FIG. 8 is a functional block diagram of the embodiment. The functional block of the image forming apparatus 1 of the embodiment is basically the same as the first embodiment except that the role management unit 206' performs the process for displaying the confirmation screen 70.

Figure 9:
FIG. 9 is an example of an authority table.

The role storage area 30 of the image forming apparatus 1 includes an authority table 60 in which the authority and authorities necessary for providing the authority are associated with each other. FIG. 9 is an example of the authority table 60. As described above, in order to provide authorities such as Color Copy or Store to Local Share, a plurality of authorities needs to be selected.

When the new role is created, if the information indicating the authority selected in the role creation screen 40 is obtained, as an authority determination unit, the role management unit 206' determines whether the necessary authority is selected regarding each authority displayed on the confirmation screen 70 with reference to the authority table 60. For example, regarding the Color Copy authority, if the Copy Function authority is selected while the Color authority is not selected, it is determined that the authority of the Color Copy cannot be provided since not all the authorities necessary for the Color Copy are selected.

Thereafter, based on the determination result of the role management unit 206', the display control unit 202 displays the confirmation screen 70. As the case in the above example, when the Copy Function is selected while the Color is not selected, the authority of the Copy Function is displayed as provided (Enable), but the authority of the Color Copy is displayed as not provided (Disable), as shown in FIG. 7.

As described so far, according to the embodiment, when the new role is created, it is possible to display the confirmation screen by which the authorities to be provided and the authorities not to be provided to the role can be confirmed at a glance as a result. By confirming the confirmation screen, it is possible to confirm a case in which the authority desired to be provided is not provided and a case in which the authority desired not to be provided is provided. Therefore, it is possible to create the proper role.

In the embodiment, description is made in which the confirmation screen 70 is displayed, for example, when the newly created role is saved; however, the embodiment is not limited thereto. For example, the display corresponding to the confirmation screen 70 may be performed in the role creation screen 40. If the role management unit 206' determines the existence of each authority and displays the confirmation screen 70 in the role creation screen 40 with reference to the authority table 60 whenever the base role is selected or the checkbox of the authority is checked or unchecked, it is possible to select the base role and the authority while confirming the existence of each authority.

Third Embodiment

Next, the third embodiment will be described. This embodiment is different from the first embodiment in a point that the image forming apparatus 1 does not include the role storage area 30 storing the role table 32, and a role storage area 30' storing the role table 32 is stored in a server 100 instead.

Figure 10:
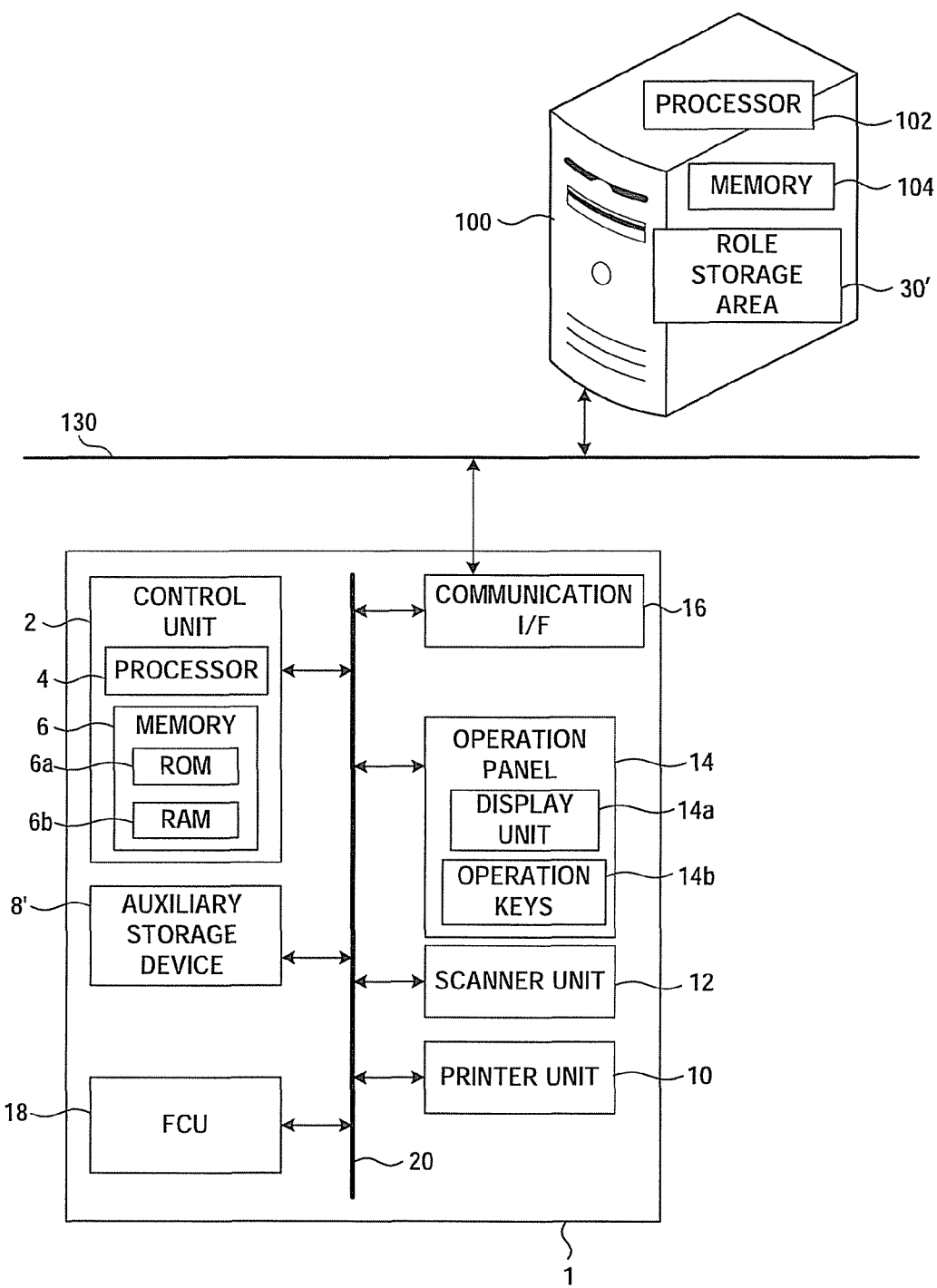
FIG. 10 is a block diagram describing the configuration of a system including an image forming apparatus and a server.

FIG. 10 is a block diagram describing the configuration of the system including the image forming apparatus 1 of the embodiment and the server 100.

The image forming apparatus 1 is the same as the first embodiment except that an auxiliary storage device 8' does not include the role storage area 30'.

The server 100 includes a processor 102, a memory 104, and the role storage area 30'.

In the image forming apparatus 1 of the embodiment, when the role creation screen 40 is displayed to create the new role, the role information obtaining unit 204 accesses the role storage area 30' of the server 100 through the network 130. Thereafter, from the role table 32 stored in the role storage area 30', the role information obtaining unit 204 obtains the information indicating the authority associated with the base role selected in the role creation screen 40.

The embodiment is the same as the first embodiment in the point that the display control unit 202 displays a state where the checkbox of the authority associated with the selected role is checked in the authority display column 48 of the role creation screen 40, based on the information obtained by the role information obtaining unit 204.

Also, in the embodiment, when the new role is created in the role creation screen 40 and the created role is registered in the role table 32, the role management unit 206 outputs the information in which the information such as the name indicating the created role is in association with the information indicating the selected authority to the server through the network 130. Thereafter, the server 100 registers the created role in the role table 32 of the role storage area 30'.

According to the embodiment, it is possible to save the created role in an external device of the image forming apparatus 1. Therefore, it is possible to use the base role registered in advance and the newly created role in an image forming apparatus and a client terminal other than the image forming apparatus 1 when the role is created.

According to the invention described so far, it is possible to provide an image forming apparatus which can easily create a role that is an assembly of the authorities for using each function of the image forming apparatus.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
    an operation input unit receiving an input of operation performed by a user;
    a selection information obtaining unit obtaining role selection information indicating a base role as a basis of a role to be newly created selected by the input of the operation performed in the operation input unit from at least one role having at least one authority per role and registered in advance;
    an authority information obtaining unit obtaining information indicating the authority of the selected base role;
    a display control unit displaying a role creation screen in which the authority that can be provided to the role to be newly created can be selected, the role creation screen comprising at least one base role selection column for selecting the base role from roles registered in advance and displaying a state where the authority of the selected base role is selected as an authority to be provided to the role to be created in the role creation screen based on the information indicating the authority obtained by the authority information obtaining unit;
    a selected authority information obtaining unit obtaining the information indicating the authority that is selected when an input for completing selection of authority is performed, in the case the input for completing the selection of authority is performed in the role creation screen by the operation input unit; and
    a storage control unit storing the authority obtained by the selected authority information obtaining unit in a storage area in association with the information indicating the created role.

2. The apparatus according to claim 1, wherein the selection information obtaining unit obtains role selection information of a plurality of roles selected in the base role selection column, and the display control unit displays a state where the authorities of the selected plurality of roles are selected in the role creation screen, based on the obtained role selection information.

3. The apparatus according to claim 1 further comprising:
    a determination unit determining whether the authority to be provided to the role to be created is the same as the authority of the role registered already, wherein, when the authority to be provided to the role to be created is the same as the authority of the role registered already, the display control unit displays a confirmation screen confirming whether the role will be created.

4. The apparatus according to claim 1 further comprising:
    a determination unit determining whether the information indicating the role to be created is the same as the information indicating any role registered already, wherein, when the information indicating the role to be created is the same as the information indicating any role registered already, the display control unit displays the information indicating the role registered already and determined to be the same in the selection column.

5. The apparatus according to claim 1, wherein, based on the selection of the authority provided to the role to be created performed in the role creation screen, the display control unit displays a list of the authorities to be provided and the authorities not to be provided to the role to be created.

6. The apparatus according to claim 5, wherein the authority includes a composite authority to be provided by the selection of a plurality of authorities, and the apparatus further comprises an authority determination unit determining whether all authorities constituting the composite authority are selected in the role creation screen.

7. An authority management method of an image forming apparatus comprising:
    receiving an input of an operation performed by user,
    obtaining role selection information indicating a base role as a basis of a role to be newly created selected by the input of the operation from at least one role having at least one authority per role and registered in advance;
    obtaining information indicating the authority of the selected role;
    displaying a role creation screen in which the authority that can be provided to the role to be newly created can be selected, the role creation screen comprising at least one base role selection column for selecting the base role from roles registered in advance and displaying a state where the authority of the selected base role is selected as an authority to be provided to the role to be created in the role creation screen based on the information indicating the obtained authority;

obtaining the information indicating the authority that is selected when an input for completing selection of authority is performed, in the case the input for completing the selection of authority is performed in the role creation screen; and storing the obtained authority selected when the input for completing the selection in a storage area in association with the information indicating the created role.

8. The method according to claim 7 further comprising:
obtaining the role selection information of a plurality of roles selected in the base role selection column; and
displaying a state where the authorities of the selected plurality of roles are selected in the role creation screen, based on the obtained role selection information.

9. The method according to claim 7 further comprising:
determining whether the authority to be provided to the role to be created is the same as the authority of the role registered already; and
displaying a confirmation screen confirming whether the role will be created, when the authority to be provided to the role to be created is the same as the authority of the role registered already.

10. The method according to claim 7 further comprising:
determining whether the information indicating the role to be created is the same as the information indicating any role registered already; and
displaying, when the information indicating the role to be created is the same as the information indicating any role registered already, the information indicating the role registered already and determined to be the same in the selection column.

11. The method according to claim 7 further comprising:
displaying a list of the authorities to be provided and the authorities not to be provided to the role to be created, based on the selection of the authority to be provided to the role to be created performed in the role creation screen.

12. The method according to claim 11,
wherein the authority includes a composite authority to be provided by the selection of a plurality of authorities, and
the method further comprises determining whether all authorities constituting the composite authority are selected in the role creation screen.

13. An authority management system of an image forming apparatus comprising:
an operation input unit receiving an input of operation performed by a user;
a storage area storing information indicating a role having at least one authority is association with an authority of the role;
a selection information obtaining unit obtaining role selection information indicating a base role as a basis of a role to be newly created selected by an input of the operation performed in the operation input unit from at least one role stored in the storage area;
an authority information obtaining unit obtaining information indicating the authority of the selected base role;
a display control unit displaying a role creation screen in which the authority that can be provided to the role to be newly created can be selected, the role creation screen comprising at least one base role selection column for selecting the base role from roles registered in advance and displaying a state where the authority of the selected base role is selected as an authority to be provided to the role to be created in the role creation screen based on the information indicating the authority obtained by the authority information obtaining unit;
a selected authority information obtaining unit obtaining the information indicating the authority that is selected when an input for completing selection of authority is performed, in the case the input for completing the selection of authority is performed in the role creation screen by the operation input unit; and
a storage control unit storing the authority obtained by the selected authority information obtaining unit in a storage area in association with the information indicating the role to be created.

14. The system according to claim 13,
wherein the selection information obtaining unit obtains role selection information of a plurality of roles selected in the base role selection column, and
the display control unit displays a state where the authorities of the selected plurality of roles are selected in the role creation screen, based on the obtained role selection information.

15. The system according to claim 13 further comprising:
a determination unit determining whether the authority to be provided to the role to be created is the same as the authority of the role registered already,
wherein, when the authority to be provided to the role to be created is the same as the authority of the role registered already, the display control unit displays a confirmation screen confirming whether the role will be created.

16. The system according to claim 13 further comprising:
a determination unit determining whether the information indicating the role to be created is the same as the information indicating any role registered already,
wherein, when the information indicating the role to be created is the same as the information indicating any role registered already, the display control unit displays the information indicating the role registered already and determined to be the same in the selection column.

17. The system according to claim 13, wherein, based on the selection of the authority to be provided to the role to be created performed in the role creation screen, the display control unit displays a list of the authority to be provided and the authority not to be provided to the role to be created.

* * * * *